UNITED STATES PATENT OFFICE.

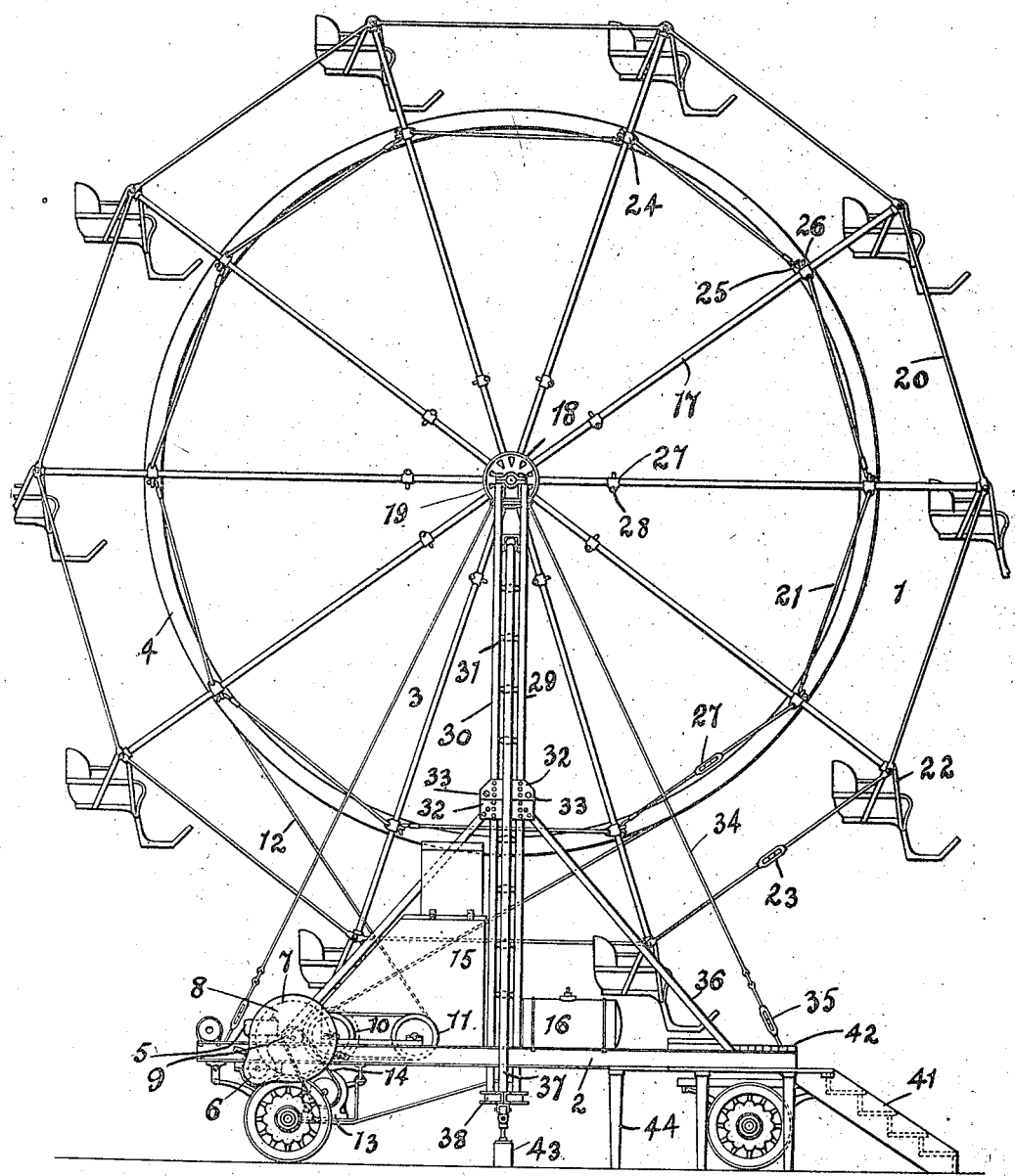

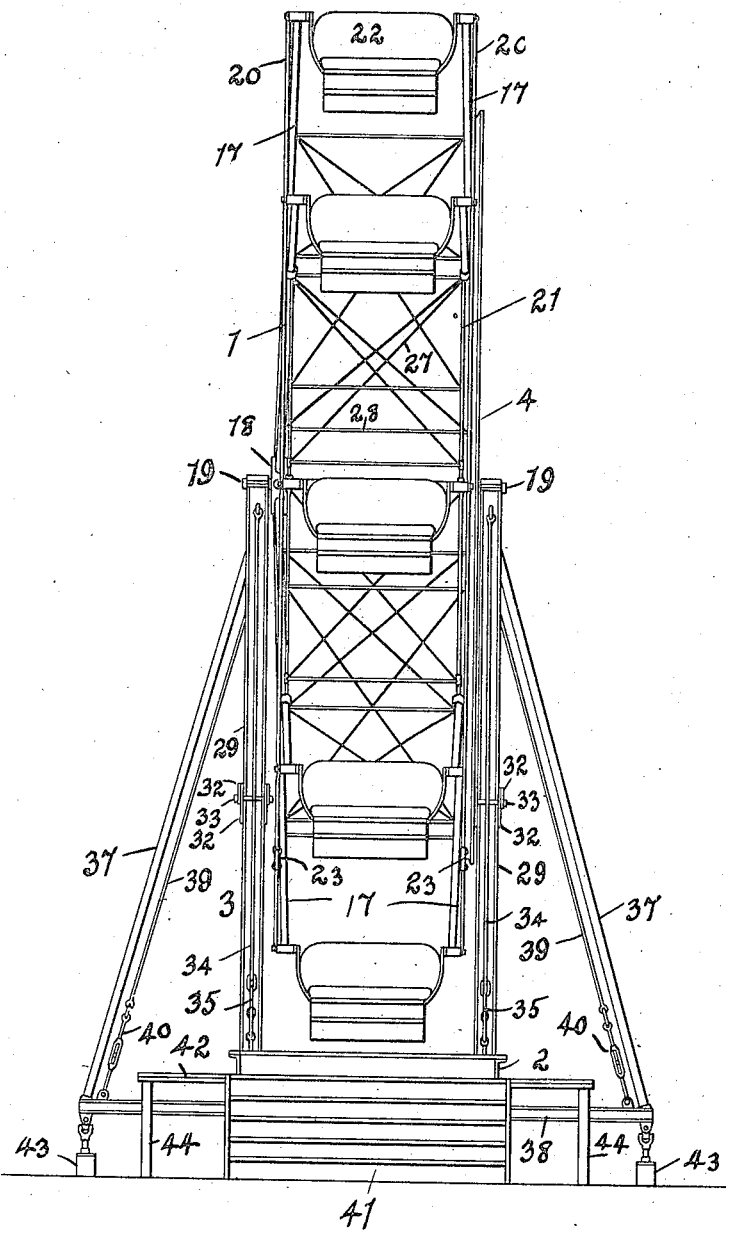

HARVEY L. MILLER, OF LEAVENWORTH, KANSAS, ASSIGNOR TO C. W. PARKER, OF LEAVENWORTH, KANSAS.

PORTABLE AMUSEMENT DEVICE.

1,262,687.

Specification of Letters Patent. Patented Apr. 16, 1918.

Application filed December 12, 1914. Serial No. 876,942.

*To all whom it may concern:*

Be it known that I, HARVEY L. MILLER, a citizen of the United States, residing at Leavenworth, in the county of Leavenworth and State of Kansas, have invented certain new and useful Improvements in Portable Amusement Devices, of which the following is a specification.

My invention relates to amusement devices, and particularly to that class of amusement devices popularly known as Ferris wheels, consisting of a wheel of large size, supported to rotate about a horizontal central axis and carrying around the rim thereof a number of seats for the passengers.

The primary object of my invention is to provide a Ferris wheel which can be mounted upon a suitable truck, and which will be so constructed that it can be easily put up and quickly taken down; whereby the wheel can be transported from place to place on its own truck and assembled and used anywhere with very little trouble and expense.

A preferred embodiment of my invention is shown in the accompanying drawings; the same characters of reference being used to indicate the same parts throughout the several views. On said drawings Figure 1 is a side elevation of my invention and Fig. 2 is an end view of the same; both views showing the wheel in assembled relation.

In the particular description of my invention, I employ the numeral 1 to indicate the wheel as a whole. I show it mounted upon a suitable truck 2, which supports a tower 3 at the upper end of which the wheel 1 is pivotally carried. The truck 2 will of course be mounted upon wheels and the chassis will be made of beams of the required strength, as will be readily understood. The wheel 1 will carry a grooved ring 4 over which passes the operating rope or chain which maintains the wheel in rotation.

In order to provide power for rotating the wheel 1, I mount at one end of the chassis of the truck 2 a suitable motor, such as a gasolene engine 5. The shaft of this engine carries a pinion 6 which meshes with a toothed wheel 7 and both the gear 6 and wheel 7 are preferably mounted at one side of the chassis of the truck, and are covered by a gear casing 8. The shaft 9 of the gear 7 may extend entirely across the chassis of the truck and carry at its opposite end a pinion not shown, but similar to the pinion 6, and arranged to mesh with a gear similar to the gear 7 and mounted on a shaft which carries a pulley or drum 10. Opposite this pulley or drum is rotatably mounted on the chassis or truck a similar pulley or drum 11, and the operating rope or chain 12 which passes around the ring 4, may take one or more turns about both of these pulleys or drums 10 and 11. Hence, the endless rope or chain 12 can be kept in motion to turn the wheel 1.

I may also mount below the chassis of the truck 2 a small dynamo 13, driven by means of a belt 14, a suitably grooved pulley being mounted on the armature shaft of the dynamo to hold the belt. The belt 14 also passes over another pulley, and is driven thereby, and I show a pulley for this purpose, mounted on the shaft 9. Of course, this driving pulley may be located at different points, and the illustration in Fig. 1 is intended to be taken as diagrammatic only. But I may say that I prefer to mount the driving pulley directly on the shaft of the engine 6. This is because the engine runs continuously and is adapted to be connected by a clutch to turn the wheel 1 and the intermediate gearing when all the seats 22 are occupied. Amusement devices of this sort are generally used only at night, because there is seldom any patronage to be obtained in the working hours of the day. Hence, when the wheel 1 is required, continuous illumination is always needed; and by keeping the engine 6 running constantly after once setting it in operation, not only are the lights supplied, but also the trouble of starting the engine anew for each load of passengers is obviated. A suitable clutch, not shown, may be employed to connect the engine shaft to the gear 6, and be operated by a lever also not shown to connect the shaft to the gear and disconnect it therefrom. Then the operator need only manipulate the lever to start and stop the wheel 1 without in any way interfering with the dynamo or engine. The wheel 1 will of course have a suitable brake, operated by a second lever, not shown, to stop the wheel 1 and hold it stationary, and this brake will be released before the engine clutch is moved to cause the engine to turn the wheel 1. Such brakes are commonly used. Also the engine clutch, lever and gearing between the engine and wheel 1 are well understood, and may be variously arranged, and specific illustration thereof is not deemed necessary.

I cool the engine 5 by means of water from a tank 15 and supply it with fuel from a tank 16, both tanks being carried by the truck 2, as shown in Fig. 1.

The wheel 1 comprises spokes 17 at both sides joined at their inner ends to hubs 18, these hubs being mounted on journals 19 at the upper end of the tower 3. At their outer ends, the spokes 17 are connected by means of rods or links 20, both the spokes and the rods being perforated so that they can be detachably fastened together, as by bolts and nuts, or any other suitable device. There is also an inner row of rods or links 21. The seats 22 are mounted to swing at the outer ends of the spokes in the usual way. One of the outer rods 20 will be made in two sections comprising a turn buckle 23 so that when all the rods 20 and seats 22 are in place, the buckle 23 can be turned up to make the whole construction tight and rigid.

The spokes 17 also carry at some distance from their outer ends straps or sleeves 24, fixed to the spokes, and having pivotally connected thereto the inner rods 21. These sleeves 24 will also carry eyelets 25 and the outer ends 26 of the rods 21 will be hook-shaped so that they can be passed through these eyelets. One of the rods 21 will also be in sections, joined by a turnbuckle 27 which facilitates the tightening of the parts after assembling, the same as the buckle 23.

I may also mount on the spokes 17 between the sleeves 24 and the hubs 18 fixed sleeves 27 which are so shaped as to receive the ends of cross braces 28. These braces may extend either horizontally or diagonally across from the spokes at one side of the wheel to the spokes at the other side, making a very strong and rigid framework for the wheel that is fully capable of carrying any weight that may be placed in the seats 22.

It will be apparent from as much of the description as has now been given, that the wheel 1 can very easily be taken apart when the device is to be loaded for shipment. I first remove the wheel from the tower and then take off the seats 22 as is ordinarily done in a machine of this type. I next remove the grooved ring 4, after which the turnbuckles 23 and 27 can be loosened to relieve the tension on the rods 20 and 21. The rods 20 are then removed and the ends 26 of the rods 21 are disengaged from the eyelets 25 and folded against the spokes 17; leaving the spokes 17 and the inner rods intact. The spokes are then removed in pairs from the hub 18, completing the operation. After taking apart the seats, spokes 17 and rods 21 can be stored on the truck 2 and placed in a car or other vehicle for transportation.

I shall now describe the construction of the tower 3 at the top of which the wheel 1 is carried. This tower comprises upright columns 29, one at each side of the truck 2, and both columns 29 are jointed at the middle, thus providing a fixed lower section and a pivoted upper section which can be folded downward. These upper and lower sections are each constituted of a pair of parallel beams 30 connected by cross bars 31. At the lower ends of the upper sections are plates 32 rigidly secured in place on both the inner face and outer face of the sections, and similar plates are rigidly fastened at the upper ends of each lower section on the inner and outer faces of the same. The plates at the lower end of each upper section are designed to overlap the plates at the upper end of each lower section, and these overlapping plates have two perforations which receive bolts 33. One of these bolts will be made removable and it will be seen that when both bolts are in place, the two sections are held in rigid relation with respect to each other, making a rigid column, but when one of the bolts is taken out, the upper sections can each be turned around the other bolt as a hinge and folded downward till the upper ends thereof, which carry the journals 19, rest upon the truck. The lower sections of the columns 29 remain permanently in upright positions, as they are not high enough to be in the way when the apparatus is to be removed to another town or city.

When the apparatus is set up, the tower is strengthened by means of braces 34, two of which are at each side, extending from the tops of the columns 29 to the truck, and they comprise turnbuckles 35 for tightening. Fixed braces 36 may also be employed by attaching the lower ends thereof to the chassis of the truck and the lower ends to the tops of the lower sections of the columns 29. I also employ brace beams 37, engaging the upper sections of the columns 29 at their tops and having their opposite ends resting upon the extremities of a cross beam 38, permanently secured to the truck, below the chassis and between the wheels thereof. The lower ends of the beams 30 of the lower sections of the columns 29 may be permanently fixed to this cross beam 38, as shown in Fig. 1. At their lower ends, the brace beams 37 may be fastened to the cross beam 38 as by removable bolts, and may have notched upper ends to engage the cross bars 31. Brace rods 39, comprising turnbuckles 40 may also be secured to the cross beam 38 and extend upward parallel with the brace beams 37, being joined at their upper ends to the upper sections of the columns 29, whereby when the buckles 40 are tightened, any play between the upper ends of the brace beams 37 and the cross beams 31, which they engage, will be eliminated.

It will now be seen that after the wheel 1 is taken down, the tower cannot be dismantled without first loosening the turn buckles 35 and 40. This will enable the braces 34 and 39 to be unhooked, and the ends of these braces will be shaped and secured in the manner required to give this result. The brace beams 37 are then taken down; whereupon it is only necessary to take out one of the bolts 33 to enable the upper sections of the columns 29 to be lowered.

When the wheel is in operation, I provide steps 41 leading to a platform 42, at the front of the truck, so that passengers can reach the seats 22. The wheels of the truck are blocked at this time to hold them stationary, and the outer ends of the cross beam 38 under the truck may be shored up by blocks or lifting jacks 43, thus taking the weight in part off the truck 2. The ends of the platform 42 may have legs 44 to support the outer ends thereof, which may be beyond the sides of the truck.

When the wheel is dismounted, and the tower also dismantled, the disconnected parts used to fasten the various members making up the wheel together; and the braces, etc., for holding the tower in proper position can be stowed on the truck 2. The same disposition can be made of the platform and steps. Hence, the wheel and the truck make up an amusement device which is not only portable and capable of being readily dismantled, but is also in effect a unitary construction which can be gotten ready for shipment and then transported with very little expense and trouble, and with very little liability of the loss of any of the various parts in transit. This advantage is due to the fact that the wheel and tower can be set up to be used and packed for transportation after using on the same truck 2.

If desired, the braces 36 may be detachably mounted so that they can be removed with the other parts when the wheel is disassembled. The beams 30 at the lower sections 29 are of course rigidly secured to the side beams of the truck 2 and the cross beam 38 need not be supported by anything else than the lower sections of these columns when the device is not in use. The jack screws at the outer end of the cross beam are preferably permanently attached thereto, and are placed upon suitable blocks when the tower and wheel are set up. After setting up, the weight of the wheel and passengers will be supported by the ends of the beam and on the four wheels of the truck, making an even distribution of the load and the utmost possible equilibrium.

It is understood, of course, that the tank 16, the reservoir 15, the gasolene motor, the dynamo and the gearing by which the belt 12 is driven are permanently located on the truck 2, so that when the wheel and tower are dismounted the parts can easily be stored on the top of the truck for shipment.

From the above description, it will be seen that I have produced a Ferris wheel which is very simple in its construction and mode of operation and very easy to set up and take down; while, at the same time being exceedingly safe, stable and practical. I do not of course wish to be limited to the exact structural details herein set forth, but I desire to reserve to myself the right to make such changes in the shape, size and arrangement of the parts as fairly fall within the scope and spirit of my invention.

Having described my invention, what I believe to be new and desire to secure and protect by Letters Patent of the United States is:—

1. In a construction of the kind described the combination of a truck and a dismountable wheel and a dismountable tower including collapsible sections for carrying the wheel, mounted on the truck.

2. In a construction of the kind described, a tower comprising a vertical column consisting of an upper section and a lower section, a plate secured to the top of the lower section and the bottom of the upper section, said plates overlapping and each plate having a plurality of openings located to be in alinement with similar openings in the other plate, and means receivable in said openings to connect said plates together, all but one of said means being removable, whereby said plates may serve as a hinge, permitting the lowering of the upper section.

3. In a construction of the kind described, the combination of a truck and a tower thereon, comprising a vertical column secured to each side of the truck, each column consisting of an upper section and a lower section, a plate secured to the top of each lower section, a plate secured to the bottom of each upper section, said plates overlapping, each of said plates having a plurality of openings located to aline with similar openings in the adjacent plate, and means receivable in said openings to connect said plates and hold the sections in rigid relation, all but one of said means being removable to permit the plates to serve as hinges, whereby the upper sections can be lowered.

In testimony whereof, I, HARVEY L. MILLER, have signed my name to this specification, in the presence of two subscribing witnesses, this sixteenth day of November, 1914.

HARVEY L. MILLER.

Witnesses:
F. A. WALTER,
E. F. MAEDER.